United States Patent [19]
Shafik

[11] Patent Number: 6,142,384
[45] Date of Patent: Nov. 7, 2000

[54] PERSONAL PORTABLE LIQUID FILTER DEVICE

[76] Inventor: Aasef M. Shafik, 5408 Carlin Springs Rd., Arlington, Va. 22203

[21] Appl. No.: 09/238,944

[22] Filed: Jan. 28, 1999

[51] Int. Cl.[7] .................................................. A47G 21/18
[52] U.S. Cl. ................................ 239/33; 239/24; 239/29; 222/189.1; 210/282
[58] Field of Search .................................. 239/16, 24, 29, 239/33, 326, 590, DIG. 23; 210/282, 459; 222/189.1, 464.2; D7/300.2

[56] References Cited

U.S. PATENT DOCUMENTS

| | | |
|---|---|---|
| 33,443 | 10/1861 | Mellen ................................ 210/266 X |
| 231,494 | 8/1880 | McCauley et al. ................. 210/266 X |
| 580,527 | 4/1897 | Martin . |
| 1,000,332 | 8/1911 | Dyer . |
| 1,001,218 | 8/1911 | Parenteau . |
| 1,254,115 | 1/1918 | Brand . |
| 1,996,203 | 4/1935 | Hollingsworth . |
| 2,036,706 | 4/1936 | Law . |
| 2,128,448 | 8/1938 | Wright . |
| 2,812,257 | 11/1957 | Scisorek . |
| 2,867,536 | 1/1959 | Mead et al. . |
| 2,901,357 | 8/1959 | Epstein . |
| 2,983,616 | 5/1961 | Levi . |
| 3,463,361 | 8/1969 | Cook et al. . |
| 3,545,980 | 12/1970 | Stanger . |
| 3,615,595 | 10/1971 | Guttag . |
| 3,620,770 | 11/1971 | Harvey . |
| 4,298,475 | 11/1981 | Gartner . |
| 4,921,713 | 5/1990 | Fowler . |
| 4,995,976 | 2/1991 | Vermes et al. . |
| 5,039,012 | 8/1991 | Inaba ........................................ 239/33 |
| 5,094,861 | 3/1992 | D'Auguste et al. . |
| 5,156,335 | 10/1992 | Smith et al. . |
| 5,362,385 | 11/1994 | Klegerman et al. ................ 210/282 X |
| 5,509,605 | 4/1996 | Cripe . |
| 5,518,613 | 5/1996 | Koczur et al. ...................... 210/282 X |
| 5,545,315 | 8/1996 | Lonneman .......................... 210/282 X |
| 5,688,588 | 11/1997 | Cotton et al. . |

Primary Examiner—Andres Kashnikow
Assistant Examiner—Robin O. Evans
Attorney, Agent, or Firm—Dennis H. Lambert

[57] ABSTRACT

A personal portable filtration device for removing contaminants from water. In one form, the filtration device is attachable to an ordinary drinking straw, and in another form the filtration device is attachable to an enlarged section of a tubular member. In a first embodiment of the first form, the drinking straw is insertable at one end into an opening in the filter device, whereby the filter device is applied externally of the straw, and in another embodiment the filter device is sized and shaped for insertion into an end of the straw. In one embodiment of the second form, the filter device is received in an enlargement at one end of the tubular member, and in another embodiment is received in an enlargement between and spaced from the ends of the tubular member. In all forms of the invention, the filter device may consist of one or more filter media for removing one or more impurities from water, including particulate matter, objectionable odors and tastes, harmful chemicals and/or metals, microorganisms, and the like. The filter device may be replaceable so that a fresh filter device can be readily substituted for one that is no longer serviceable, and the ability to use it with an ordinary drinking straw makes it particularly convenient to use.

2 Claims, 6 Drawing Sheets

PERSONAL PORTABLE LIQUID FILTER DEVICE

BACKGROUND OF THE INVENTION

1. Field of the Invention

This invention relates generally to devices for removing contaminants from liquids, and more particularly, to a personal portable filter device for attachment to a drinking straw to remove contaminants from liquid, e.g. water, drawn through the straw.

2. Description of the Prior Art

Supplies of potable water are generally treated to remove impurities, including the removal of particulate matter, undesirable odors and tastes, and harmful microorganisms. This treatment is ordinarily accomplished at large community or municipal treatment facilities prior to distribution of the water to its point or points of use. Some users are not on municipal water supply systems, but receive their water from wells or other sources. These users must provide their own water treatment, if any is used, in order to remove contaminants from the water. This is generally accomplished by a fixed water filtration and purification system installed between the source of the water and distribution of the treated water to the point of use.

Although municipal and personal water treatment systems render the water safe for use, some undesirable impurities, such as odor and taste, can still remain. Moreover, municipal and personal water treatment systems can sometimes completely or partially fail, resulting in undesirable impurities remaining in the water supplied to the user.

Additionally, water supplies in some parts of the world are untreated or inadequately treated, with the result that persons using the water may become ill. Even if the potable water supply in some locales is safe to use, and does not produce any adverse affects in the local population, persons travelling to that locale from other areas may become ill after drinking the water due to the presence in the water of microorganisms and intestinal parasites.

Still further, persons hiking or camping in remote areas, or military personnel, may not have ready access to treated water supplies. These persons run the risk of becoming seriously ill if they use untreated water, and since no one can survive for very long without water, they must either carry with them a potable water supply, or treat the water locally obtained. In the past, various chemicals, such as iodine, and/or filtration systems, have been carried by military personnel, hikers, and campers, for example, to treat locally obtained water. While these methods can prevent illness that would otherwise be caused by use of contaminated water, they are inconvenient to use and/or may leave undesirable tastes and odors in the water.

A variety of portable water purification devices for personal use have been developed in the prior art. These are exemplified by U.S. Pat. Nos. 4,995,976, 5,509,605, and 5,688,588. The water purification devices described in these patents comprise a filter device in association with a drinking straw whose proximal end is placed in the mouth of the user, and the distal end is placed in a source or supply of water. The water is drawn by the user through the straw and filter device, which removes contaminants from the water. While these devices function adequately for their intended purpose, they require specially constructed tubular members, and/or are relatively complex and expensive in construction. Further, these devices incorporate multiple purification devices arranged in series, thereby providing resistance to flow of water and may require substantial effort to draw the water through the straw.

Accordingly, there exists a need for a personal portable liquid filter or purification device that is simple and inexpensive in construction, and which does not require an inordinate amount of effort to draw liquid through the device. Moreover, since a specially constructed tubular member for holding the liquid purification device may become damaged or broken during handling and use, or may not be readily available, there is need for a personal portable liquid purification and filtration device which may be attached to a conventional drinking straw or to any other suitable tube, whereby it is necessary only to carry one or more of the purification devices for attachment to a conventional straw or other tube.

SUMMARY OF THE INVENTION

The present invention provides a personal, portable liquid filter or purification device that is simple and inexpensive in construction.

In a first form of the invention, the purification device of the invention is in cartridge form replaceable in a conventional drinking straw or other tubular member for drawing liquid, e.g., water, through the straw and purification device to remove impurities from the liquid. In one embodiment of this form, the purification device is applied externally of the straw, and in another embodiment is inserted into an end of the straw.

In a second form, the purification device is assembled to a specially configured tubular member having an enlarged section for accommodating a relatively larger purification device than could be readily accommodated in a conventional drinking straw. In one embodiment of this form, the enlargement is at the end of the tubular member, and in another embodiment the enlargement is between the ends of the tubular member. The purification device in both of these embodiments may also comprise a replaceable cartridge.

Both forms of the invention include several different embodiments of purification devices. In its simplest embodiment, the purification device is of uniform composition throughout, and comprises a homogeneous mixture of one or more materials selected for their ability to remove one or more contaminants from the liquid, including bacteria and other microorganisms, objectionable tastes and odors, toxic metals and/or chemicals, sediment, and the like, depending upon the need.

An example of a suitable filter media is the bacteriostatic filter with ion exchange resin and silverized activated carbon as used in the Brita® filter, Model No. 35503, made by Brita Limited of Brampton, Ontario, Canada. This filter media is in loose granulated form and is designed to eliminate 93% of lead and copper, and to reduce chlorine taste, odor and sediment. If a granulated filter media is used in the invention, it can be mixed with a suitable binder and formed into a rigid block of desired shape, or encased as a loose granular material in a rigid shell or casing of suitable porous material.

U.S. Pat. No. 5,509,605 discloses an example of a suitable filter media formed into a block, made by mixing a binder material with a powdered filter material. The specific filter material described in this patent is commercially sold by KDF Fluid Treatment Company under the trademark "KDF".

A suitable porous material for the rigid shell can be selected from a variety of existing materials, including that described in U.S. Pat. No. 4,995,976, or that used in the manufacture of the egg shell or porex disks used in the AHP Bacteriostatic Water Treatment filter, Unit-710, made by AHP, Inc., of Springfield, Miss. Other suitable porous materials can also be used, including fine mesh screens and the like.

Rather than the filter media made by Brita®, KDF or AHP, as described above, any other filter media suitable for the intended purpose can be used, including the filter media disclosed in any of U.S. Pat. Nos. 4,995,976, 5,509,605, and 5,688,588, the disclosures of which are incorporated herein by reference. The filter media described in these patents are all intended for use with tubular members through which the liquid is drawn, and include a fibrous filter media made from a non-woven web of meltblown fibers, a non-woven web of spunbond filaments, a bonded-carded web, a fibrous batt, a filament tow, and/or an airlaid web, all as described in the '588 patent, or a molded filter media as described in the '605 patent, or a series of porous spacers and granular filter media, including a purification resin, activated carbon granules, and a bactericide resin, as described in the '976 patent.

Other examples of suitable filter media materials are the wound cotton strands as used in the OMNIFILTER®, Model No. RS2, made by Omni Corporation of Hammond, Ind., or a carbon-impregnated cellulose fibrous mat as used in the American Plumber taste, odor and sediment reduction cartridge sold under Model No. W5CIP.

In a preferred embodiment of the composition of the filter media of the invention, the filter media is mixed with a binder and formed into a homogeneous block as shown in FIGS. 1–3 and 10–24, for example.

Figure 4:
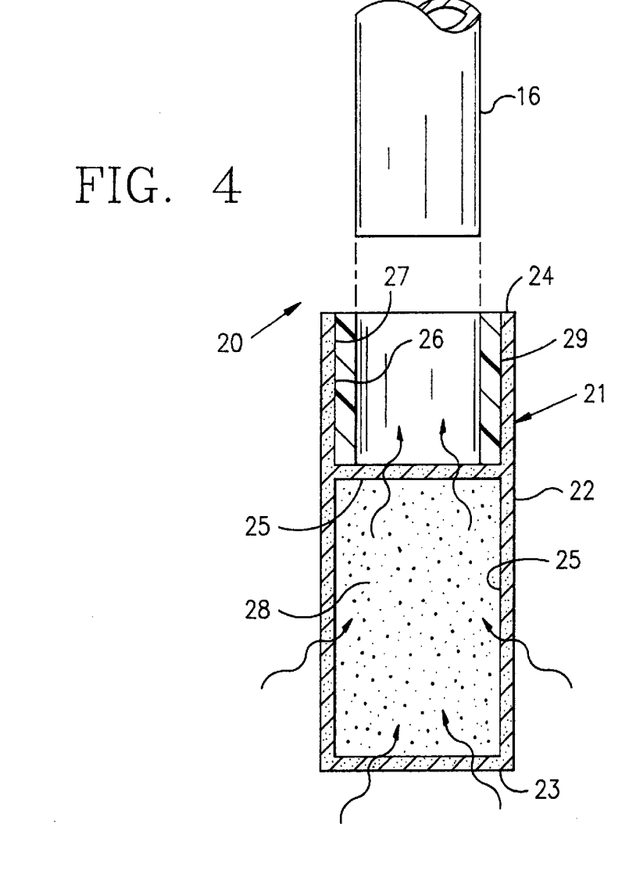
FIG. 4 is an exploded, fragmentary, longitudinal sectional view of a second embodiment of the first form of filter device, and a straw to which the filter device may be attached.
Figure 5:
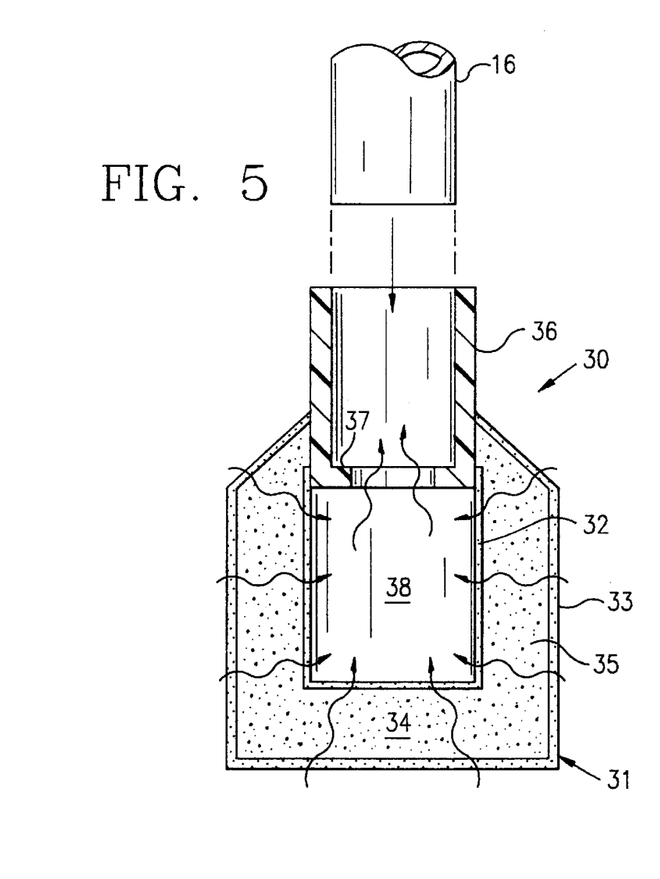
FIG. 5 is an exploded, fragmentary, longitudinal sectional view of a third embodiment of the first form of filter device, and straw to which the filter device may be attached.
Figure 6:
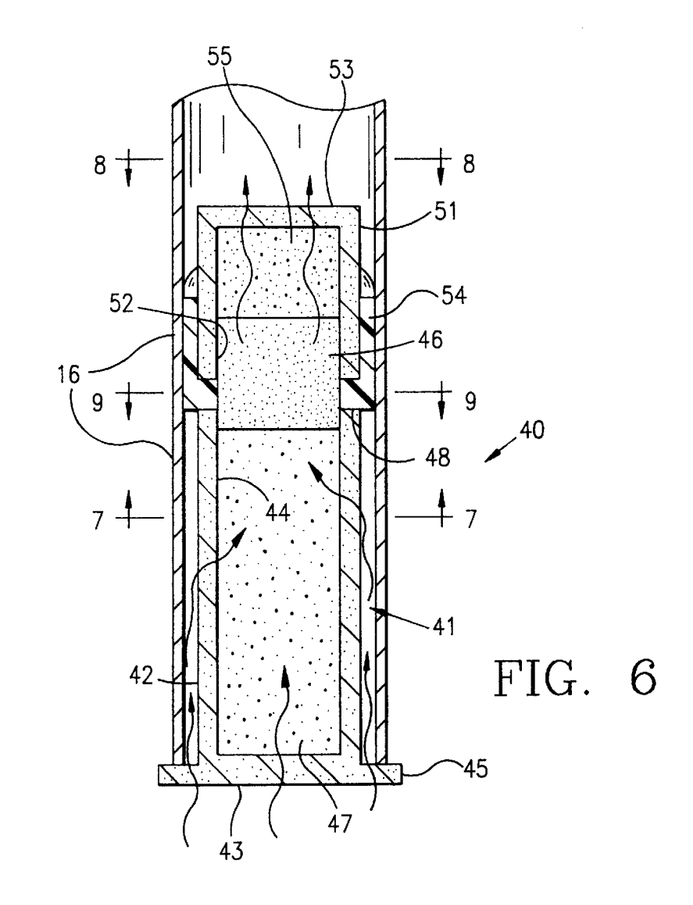
FIG. 6 is a fragmentary, longitudinal sectional view of a fourth embodiment of the first form of filter device, shown inserted into the end of a drinking straw or other tubular member.
Figure 7:
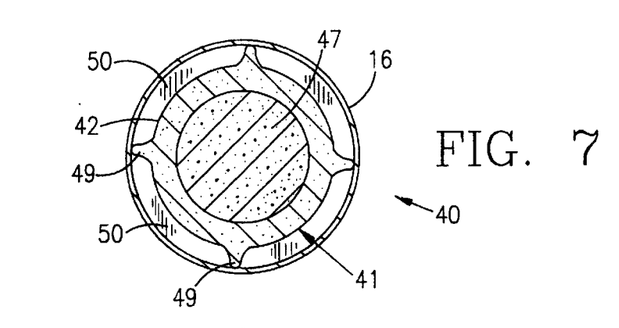
FIG. 7 is a transverse sectional view taken along line 7—7 in FIG. 6.
Figure 8:
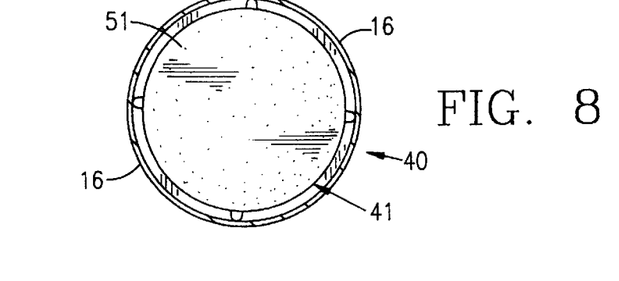
FIG. 8 is a transverse sectional view taken along line 8—8 in FIG. 6.
Figure 9:
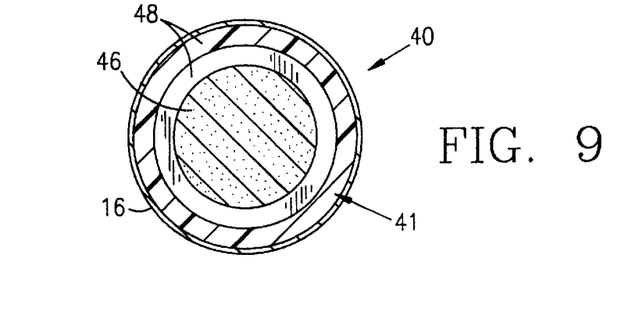
FIG. 9 is a transverse sectional view taken along line 9—9 in FIG. 6.

In an alternative embodiment of the filter media, the various media are mixed uniformly together in a loose granular form and encased in a rigid porous casing, as shown in FIGS. 4 and 5, for example.

In a further alternative embodiment of the filter media, a combination of loose granular material and a rigid block may be used, as depicted in FIGS. 6–9, 25 and 26, for example.

In the first embodiment of the first form of the invention, as shown in FIGS. 1–5, the filter media has a bore in one end thereof adapted to receive the end of a conventional drinking straw or other similar tubular member, whereby the filter is applied externally of the straw; and in the second embodiment of the first form, as depicted in FIGS. 6–16, the filter is adapted to be inserted into the end of a conventional drinking straw or other tubular member, whereby the filter is applied internally of the straw.

In the first embodiment of the second form of the invention, as depicted in FIGS. 17–22, the filter is adapted to be received in an enlarged end section of a tubular member; and in the second embodiment of the second form, as depicted in FIGS. 23–26, the filter is received in an enlargement between the ends of the tubular member.

As noted above, various constructions of filter devices can be used in each of the several embodiments of the invention, including a shaped rigid block of filter material, or a loose granular filter material contained within a rigid porous casing, or a combination of a rigid block and loose granular material. The filter device can also comprise a combination of different filter materials to remove a variety of contaminants, or it can comprise a single filter material to remove a single contaminant, depending upon the need.

Examples of shaped blocks of filter material are illustrated in FIGS. 1–3 and 10–24, wherein the filter is formed in the shape of a rigid block that has a hollow interior open at one end and closed at the other. The shaped block may comprise a single filter material for removing a single contaminant from the liquid, or it may comprise a uniformly blended mixture of a plurality of filter materials for removing a variety of contaminants.

Examples of filter devices incorporating loose granular material enclosed in a rigid porous casing are shown in FIGS. 4 and 5.

The filter devices shown in FIGS. 6–9 and 25 incorporate a combination of a shaped rigid block and loose granular material. It should be noted, however, that these filters may also be formed entirely of a shaped block, or blocks, if desired.

More specifically, in the embodiment shown in FIGS. 6–9, the filter comprises a combination of loose granular filter media and a rigid block of filter media contained within a porous rigid housing insertable into the end of a straw or other tubular device, with an inlet end of the filter device adapted to be disposed at the inlet end of the tubular device in which the filter is received. The loose granular filter media is divided into a first body of filter materials at the inlet end of the filter device, selected for their ability to kill bacteria and other microorganisms. Granules may also be present for removing other harmful contaminants, including metals, such as lead and copper, and for converting chemicals such as chlorine. A second body of loose granular filter material is disposed at the outlet end of the filter device, and is separated from the first body of granular filter material by a shaped block of filter material which may contain, for example, a strong bactericide. The body of granular filter material at the outlet end of the filter device may comprise activated carbon granules, or a mixture of activated carbon granules and other filter materials selected for a desired purpose, e.g., to remove objectionable odors and tastes. The rigid porous housing in which the two bodies of granular filter material and the plug are contained also serves to filter particulate material from liquid drawn through the device. The construction of the filter device, and its sealing engagement with the end of the tubular member in which it is received, ensures that all of the liquid must pass through all of the filter stages in the filter device before the liquid can pass to the user.

Figure 10:
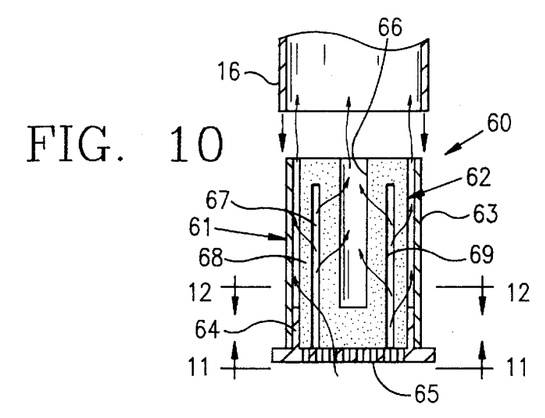
FIG. 10 is an exploded, fragmentary, longitudinal sectional view of a fifth embodiment of the first form of filter device, insertable into the end of a drinking straw.
Figure 11:
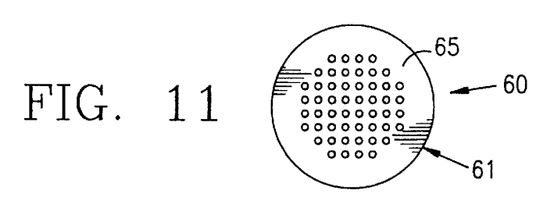
FIG. 11 is an end view in elevation taken along line 11—11 in FIG. 10.
Figure 12:
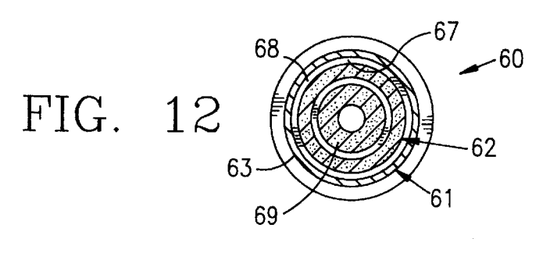
FIG. 12 is a transverse sectional view taken along line 12—12 in FIG. 10.

In the embodiment shown in FIGS. 10–12, the filter device comprises a shaped body of filter media comprising a plurality of concentric tubular structures defining a large surface area through which the liquid to be filtered passes. The block of filter material may include a mixture of various filter media for removing multiple contaminants from the liquid.

Figure 13:
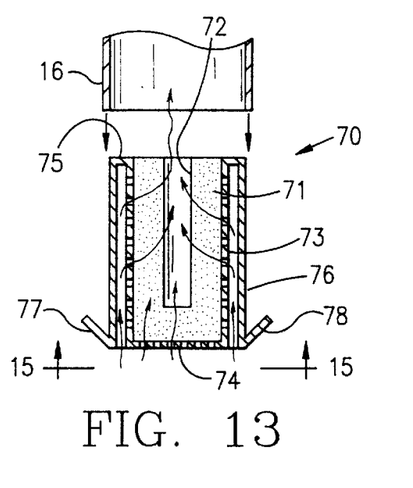
FIG. 13 is an exploded, fragmentary, longitudinal sectional view of a sixth embodiment of the first form of filter device, insertable into the end of a drinking straw.
Figure 14:
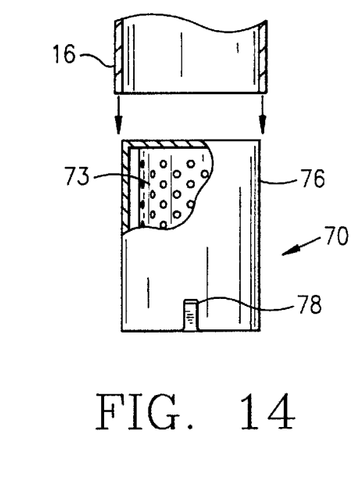
FIG. 14 is an exploded side view in elevation of the filter device of FIG. 13, with portions shown in section.
Figure 15:
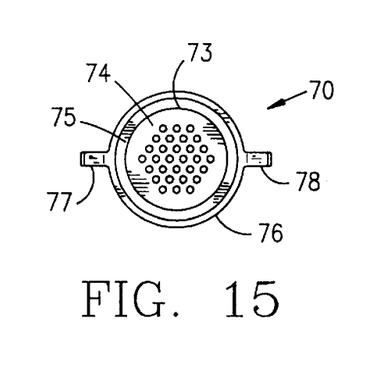
FIG. 15 is an end view in elevation taken along line 15—15 in FIG. 13.

In the embodiment shown in FIGS. 13–15, the filter media is shaped into an elongate cylindrical block having a closed inlet end and an open outlet end, held within a perforated screen housing that is secured, in turn, in the inlet end a of a tubular member through which liquid is drawn.

Figure 16:
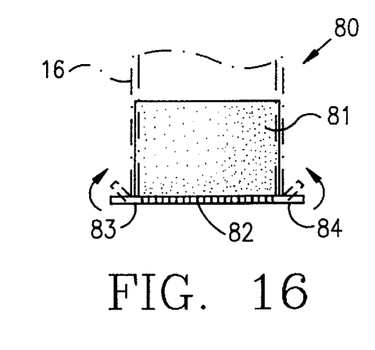
FIG. 16 is a longitudinal sectional view of a seventh embodiment of the first form of device, insertable into the end of a drinking straw or other tubular member, with a drinking straw shown in dot-and-dash lines.

In FIG. 16, the filter comprises a cylindrical plug formed of one or more types of filter media uniformly dispersed throughout the plug, with a perforated screen bonded to an inlet side thereof and having bendable tabs for securing the filter plug in the inlet end of a tubular member.

Figure 17:
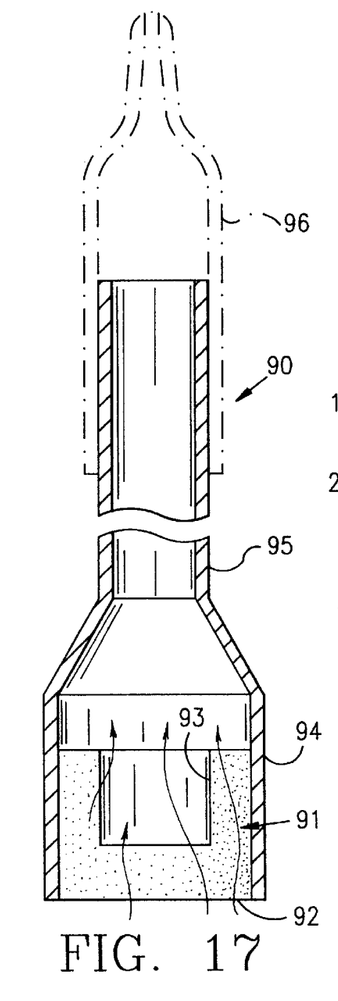
FIG. 17 is a longitudinal sectional view of a first embodiment of a second form of filter device according to the invention, with portions broken away, wherein the filter device is inserted into an enlarged end portion of a tubular member.
Figure 18:
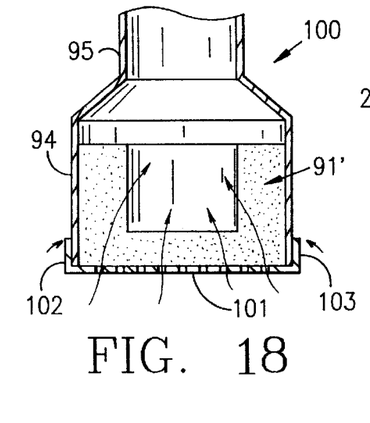
FIG. 18 is a fragmentary, longitudinal sectional view of a second embodiment of the second form of the invention.
Figure 19:
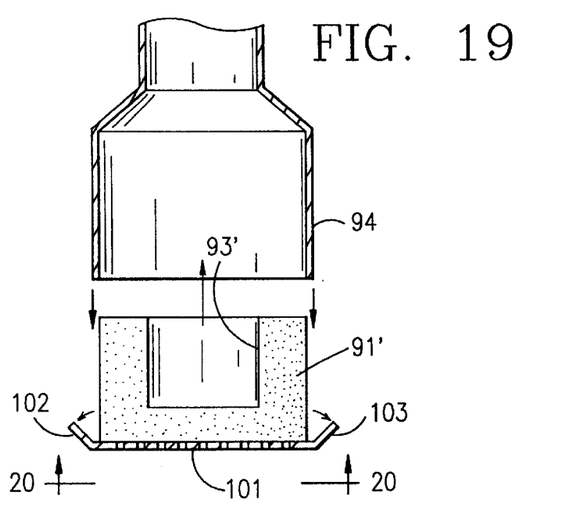
FIG. 19 is a fragmentary, exploded, longitudinal sectional view of the filter device and tube of FIG. 18.
Figure 20:
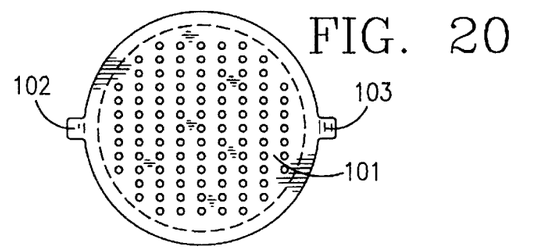
FIG. 20 is an end view in elevation taken along line 20—20 in FIG. 19.
Figure 21:
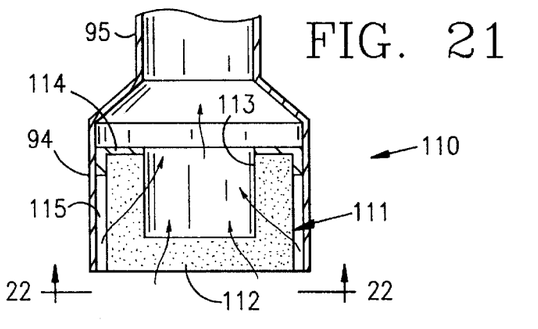
FIG. 21 is a fragmentary, longitudinal sectional view of a third embodiment of the second form of filter device.
Figure 22:
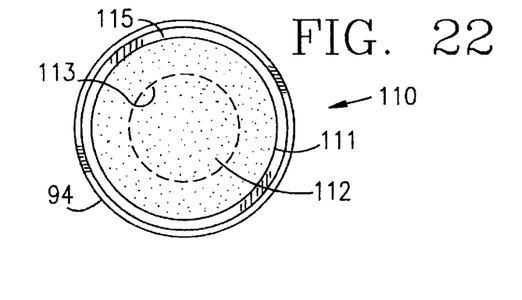
FIG. 22 is an end view in elevation taken along line 22—22 in FIG. 21.

FIGS. 17–22 show a filter device that has a hollow interior to define a cup-shaped configuration, thereby presenting a large filtration surface area, received in an enlarged end of a tubular member. The enlarged end on this tubular member enables a larger filter device to be used, to facilitate drawing a larger quantity of water through the filter device than could be drawn through a smaller device, for example. In the embodiment of FIG. 17, the filter device comprises a solid block of material frictionally received and retained in the enlarged end; the embodiment of FIGS. 18–20 show a similar device except that a perforated screen is bonded to the inlet end of the filter; and the embodiment of FIGS. 21 and 22 show a similar filter device except that it does not have a perforated screen bonded to its inlet end, and its outer cylindrical surface is shaped with a plurality of longitudinally extending ribs or protrusions which provide spaces between the outer surface of the filter device and the inner surface of the tubular member for passage of liquid to be filtered. This filter device is sealed to the inner surface of the tubular member by a sealing ring on the outlet end of the filter device.

Figures 23, 24, 25, 26, 27:
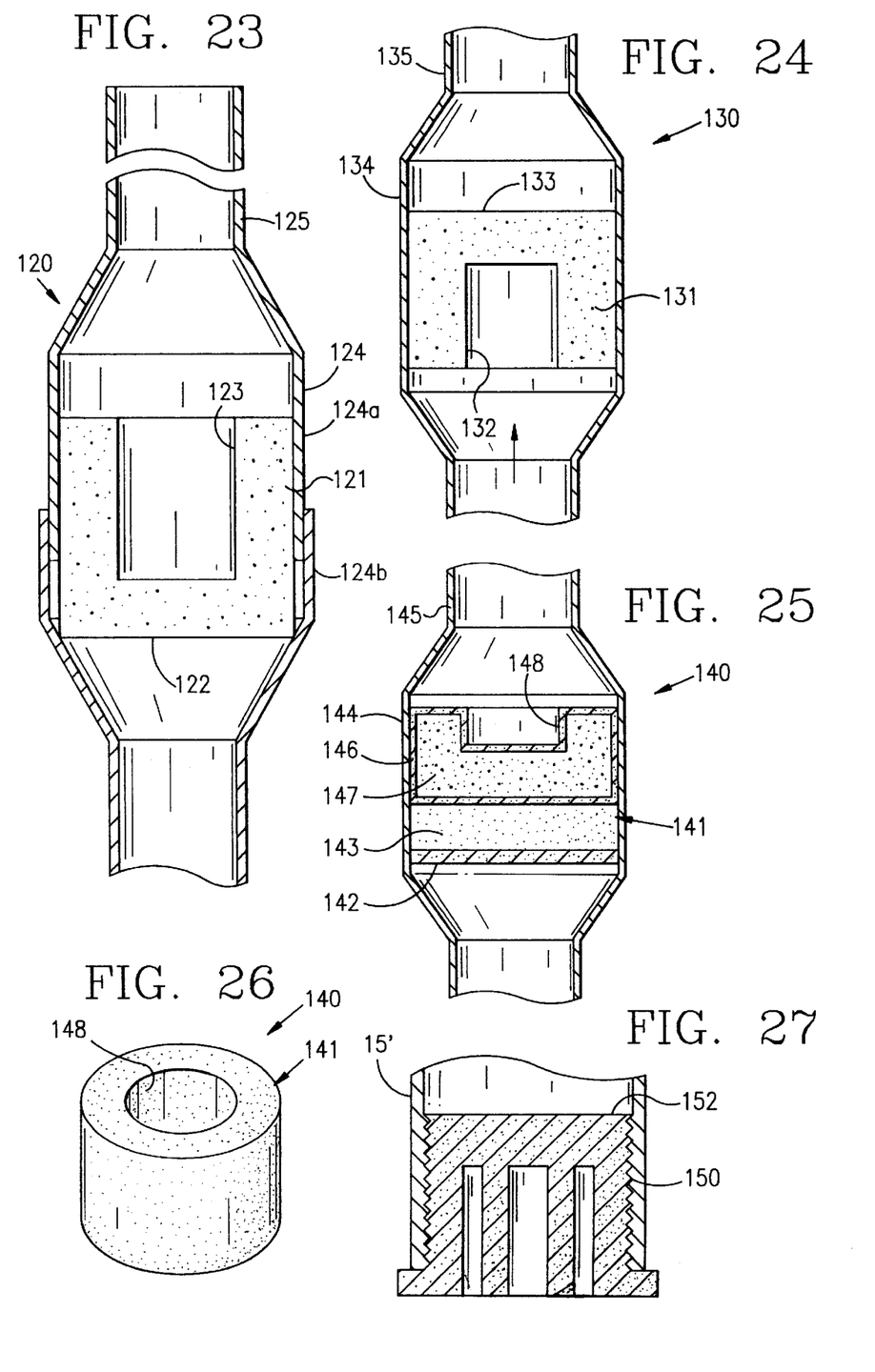
FIG. 23 is a longitudinal sectional view of a fourth embodiment of the second form of filter device according to the invention, wherein a filter device is received in an enlarged section between the ends of a tubular member.
FIG. 24 is a fragmentary, longitudinal sectional view of a second embodiment of the second form of the invention, with the filter device received in the enlargement and inverted from the position shown in FIG. 23.
FIG. 25 is a fragmentary, longitudinal sectional view of a third embodiment of the second form of the invention.
FIG. 26 is a top perspective view of the filter device of FIG. 25, shown removed from the tubular member.
FIG. 27 is a fragmentary longitudinal sectional view of a filter device according to the invention shown threaded into the end of a tubular member.

FIG. 23 shows that form of the invention wherein a cup-shaped filter device is received within an enlarged section between the ends of the tubular member. In the embodiment shown in this figure, the filter device comprises a shaped block formed of one or more uniformly dispersed filter media for removing contaminants from liquid drawn through the tubular member.

In the embodiment shown in FIG. 24, the filter device is formed as a block of uniformly dispersed filter media, while in the embodiment of FIG. 25, the filter media is separated into serially arranged components, including a porous disk (or mesh screen or the like) disposed across the inlet to the filter device, a shaped block of filter media comprising one or more types of media selected for removing one or more types of contaminants, including microorganisms, a second disk of porous filter material, and a body of granular filter material, e.g., activated carbon for removing contaminants, e.g., tastes and odors, from liquid passing through the filter. The granular filter media is contained within a rigid porous housing of generally cup-shaped configuration.

In use of the invention, it is necessary only to carry one or more of the filter devices, which can be applied to a drinking straw, one end of the straw immersed in a liquid to be filtered, and the other end of the straw inserted into the user's mouth or other source of suction, whereby the liquid may be drawn through the straw and filter device to remove impurities from the liquid.

The invention thus provides a simple and inexpensive replaceable filter cartridge or device that can be attached to a conventional drinking straw or other tubular member for filtering contaminants from liquid drawn through the straw. The filter may comprise a single filter material for removing from the liquid a single contaminant, e.g., particulate matter, or it may comprise a plurality of filter materials for removing a variety of contaminants from the liquid. In its preferred forms, the filter materials are uniformly dispersed throughout the filter device.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
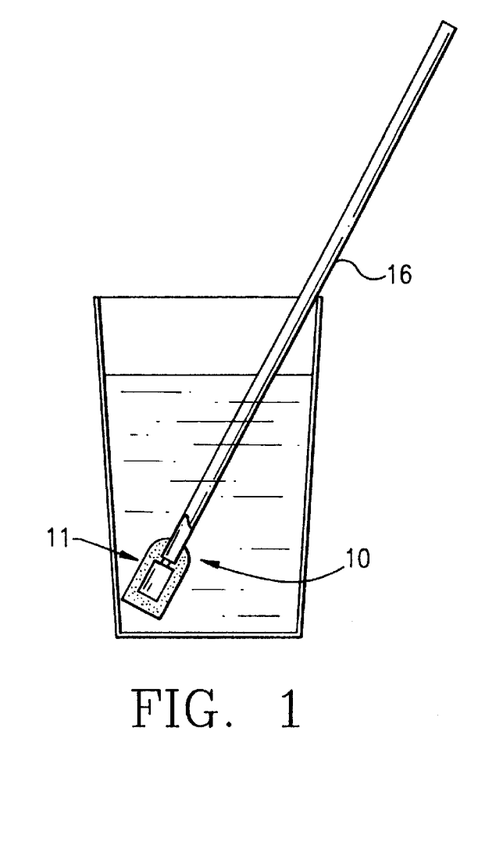
FIG. 1 is a side view in elevation of a first embodiment of a first form of filter device and drinking straw combination in accordance with the invention, wherein the filter device is applied externally of a straw.
Figure 2:
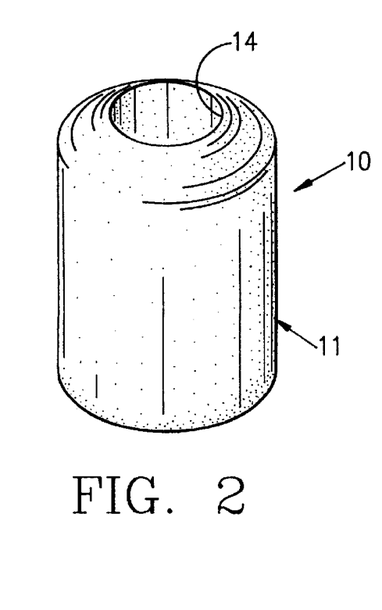
FIG. 2 is a greatly enlarged perspective view of the filter device of FIG. 1.
Figure 3:
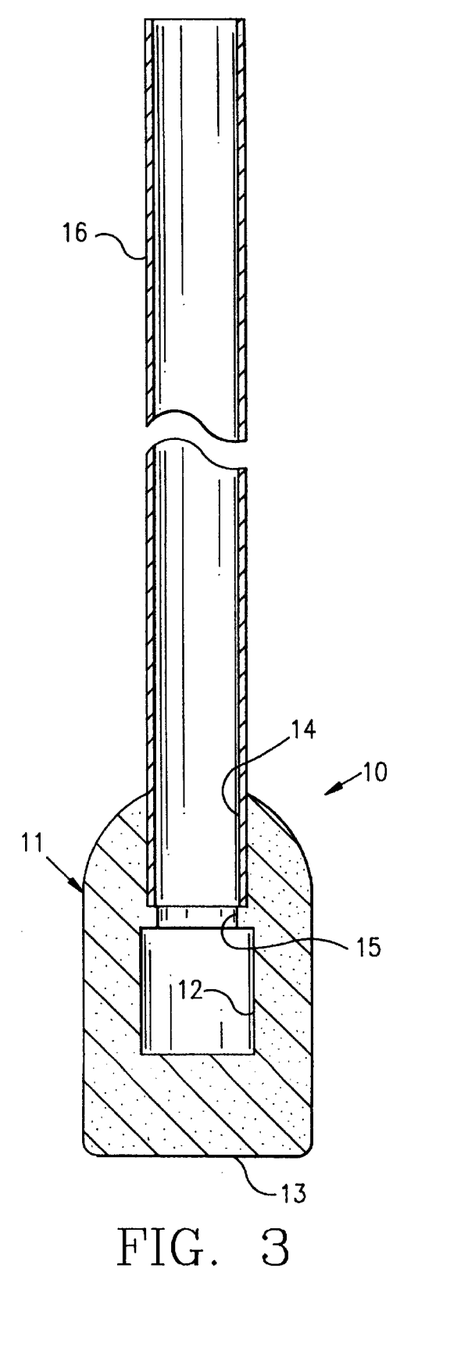
FIG. 3 is an enlarged longitudinal sectional view of the straw and filter device of FIG. 1, with portions broken away.

Referring more specifically to the drawings, a first embodiment of a first form of the invention is indicated generally at 10 in FIGS. 1–3. In this form and embodiment of the invention, the filter device 11 comprises a rigid block of filter material formed into generally a cylindrical shape with a hollow interior bore 12 having a closed inlet end 13 and an open outlet end 14. A radially inwardly projecting stop shoulder 15 is formed in the hollow interior bore 12 to limit insertion of the end of a straw 16 into the open end 14.

The straw 16 may comprise a conventional drinking straw or other similar tubular member, and the opening 14 is dimensioned to closely frictionally receive the end of the straw 16 so as to retain the filter device 11 in place on the straw during normal use, but permitting removal of the filter device from the straw and replacement with a fresh filter device, when the need arises.

The stop shoulder 15 may be formed as a continuous annular ring, as shown in FIG. 3, or the bore 12 and opening 14 may be formed of different diameters to define a shoulder therebetween, which functions to serve as a stop against which the end of the straw 16 abuts when it is inserted into the opening 14. Alternatively, the stop 15 may be formed of a plurality of circumferentially spaced apart inwardly directed protrusions on the inner surface of the bore 12 at the inner end of the opening 14.

The filter device 11 may comprise a single type of filter media uniformly distributed throughout the device and held in the form shown by a suitable binder. The filter media may be chosen for its ability to remove particulate matter, and/or odors and tastes, and/or harmful chemicals or metals, and/or microorganisms or the like.

Rather than comprise a single filter media, the filter device may comprise a plurality of filter media homogeneously distributed throughout the filter device, with the plurality of filter media selected for their ability to remove various contaminants from liquid drawn therethrough.

In this form of the invention, the filter device is disposed externally of the straw 16, and can therefore be of any desired size. Moreover, since the filter device is disposed externally of the straw 16 it can be relatively easily rinsed off to remove accumulated particulate material, thereby prolonging the useful life of the filter device. It is also relatively easy to remove from the straw, for replacement with a fresh filter device, when necessary.

If desired, the filter device can be treated with a suitable commercially available material to effect a color change in the filter device when its useful life has been exhausted, thereby providing a visual cue to the user that replacement is necessary.

A second embodiment of the first form of the invention is indicated generally at 20 in FIG. 4. In this embodiment of the invention, the filter device 21 comprises a rigid porous shell or casing 22 of cylindrical configuration, having an inlet end 23 and an outlet end 24. A transverse wall 25 extends across the interior of the casing 22, dividing the interior of the casing into a closed inlet chamber 25 and an outlet chamber 26 having an open outlet end 27.

A suitable filter material 28 is placed in the enclosed chamber 25, and a sleeve 29 is placed in the outlet chamber 26 for frictionally engaging the end of a straw 16 inserted therein.

The filter material 28 may comprise any suitable filter media, selected for its ability to remove one or more contaminants from liquid drawn through the filter device, and may be in either loose granular form or a block of filter material held together by a suitable binder.

This embodiment is also placed externally over the end of a straw 16, which may comprise a conventional drinking straw, and the filter device may therefore be made of any desired size. Moreover, since it is external of the straw 16, accumulated particulate material may be easily rinsed from the outside of the filter 21, thereby prolonging its useful life.

The rigid casing or housing 22 may be formed of any suitable porous material, as known in the art. Further, the sleeve 29 can be omitted if desired, and the bore of the outlet chamber 26 made small enough to frictionally engage the end of straw 16. However, use of the sleeve 29 can achieve a more secure frictional engagement between the filter device 21 and the straw 16.

A third embodiment of the first form of the invention is indicated generally at 30 in FIG. 5. In this embodiment, the filter device 31 comprises rigid, porous, inner and outer housings 32 and 33, respectively, spaced apart to define an annular chamber or space 34 therebetween filled with a filter material 35 selected for its ability to remove one or more contaminants from liquid passing through the filter device. For instance, the filter media or material 35 may comprise a loose, granular material, or a shaped block of material held together by a suitable binder. The filter media may comprise activated carbon granules, or a suitable resin, or other filter media known in the art for removing various contaminants, including particulate matter, odors and tastes, toxic chemicals and metals, microorganisms, and the like. If a plurality of filter media are used in the device, the various filter media are uniformly dispersed throughout the chamber 34.

An adaptor sleeve 36 is bonded in the outlet end of the filter device 31 for attaching the filter device to the end of a straw 16. A stop shoulder 37 is formed at the inner end of the adaptor 36 to limit the extent to which the end of the straw may be inserted into the device, thereby maintaining the integrity of the size of chamber 38 into which the filtered liquid passes before it enters the adapter and straw. Failure to limit the extent of insertion of the straw into the device could result in reduction in the size of the surface area available for filtering liquid passing through the device.

As in the previously described embodiments of the invention, the filter device in this embodiment is applied internally to the straw 16, and may therefore have any desired size and/or shape to maximize its effectiveness, and to enable any particulate matter accumulated on its outside surface to be easily rinsed away.

A fourth embodiment of the first form of the invention is indicated generally at 40 in FIGS. 6–9. In this embodiment, the filter device 41 is applied internally of the end of the straw 16, and its radial dimensions and configuration are therefore limited by the radial dimensions and configuration of the straw. However, the filter device 41 can have any desired length, and can be made long enough to provide a surface area for filtration that is comparable to that achieved in the first form of the invention.

In the particular embodiment illustrated in FIGS. 6–9, the filter device 41 is generally cylindrical in shape, and comprises a first rigid, porous housing 42 having a closed inlet end 43 and an open outlet end 44. The inlet end 43 has a radially enlarged flange 45 which abuts against the end of the straw 16 and forms a portion which can be gripped to withdraw the filter device from the end of straw when desired. The flange 45 also limits insertion of the filter device into the straw. A rigid porous block 46 of filter material extends across the open end of the housing 42 to form an enclosure containing a quantity of filter material 47 within the first housing 42. An annular sealing member 48 extends around the filter block 46 and across the end of tubular housing 42, and is engaged between the block 46 and the inner surface of the straw 16 to effect a seal and to assist in frictionally holding the filter device in place in the straw.

The outer surface of the housing 42 has a plurality of circumferentially spaced, longitudinally extending ribs 49 formed thereon which serve to radially center the housing 42 in the straw 16 and define a plurality of longitudinally extending channels 50 for flow of liquid between the housing 42 and straw 16. The seal 48 prevents liquid from by passing the filters 47 and 46, whereby liquid flowing into the channels 50 is constrained to pass through the wall of the rigid housing 42 and thence through the filter media 47 and filter block 46.

A second rigid, porous housing member 51 having an open inlet end 52 and a closed outlet end 53 is engaged at its open end over the filter block 46 and within a sealing skirt 54 extending axially upwardly from the seal 48. A second body of filter material 55 is contained within the space bounded by the housing 51 and the filter block 46. Thus, liquid flowing through the filter block 46 is constrained to flow through the filter media 55 and the rigid housing 51, and thence to its point of use.

The filter materials 47 and 55 may comprise one or more filter media selected for their ability to remove one or more contaminants from the liquid, and may be in loose granular form or molded into rigid blocks. The filter member 46 is formed as a rigid block to maintain the filter media 47 and 55 separate from one another. The filter material 55, in particular, may comprise activated granular carbon to remove tastes and odors from the liquid passing through the porous housing 42 and the filters 46 and 47.

A fifth embodiment of the first form of the invention is indicated generally at 60 in FIGS. 10–12. In this embodiment, the filter device 61 comprises a shaped block 62 of filter material supported in concentrically spaced relationship inside a cylindrical sleeve 63 by a sealing ring 64 disposed between the block and the sleeve at an inlet end thereof. A perforated screen 65 is secured across the inlet end of the filter block and sleeve 63 and extends diametrically outwardly at its perimeter a distance sufficient to project slightly beyond the outer surface of the end of straw 16 when the filter device is inserted thereunto. The sleeve 63 is adapted to fit snugly within the end of the straw 16 to frictionally hold the filter device in place.

The block 62 of filter material is shaped with a longitudinally extending central bore 66 opening through the outlet end of the block 62 and terminating spaced from the inlet end thereof. The bore 66 defines an outlet passage for flow of liquid passing through the filter block 62.

A deep annular channel 67 extends into the body of the filter block from the inlet end thereof to a point spaced short of the outlet end, and defines spaced apart concentric cylindrical walls 68 and 69 with the annular channel 67 therebetween for flow of liquid to be filtered. As indicated by the arrows in FIG. 10, the liquid enters the filter device through the screen 65, and then passes either upwardly through the end of the filter block aligned with the bore 66, or passes upwardly through the annular channel and thence through one or the other of the concentric annular walls 68 and 69.

A sixth embodiment of the first form of the invention is indicated generally at 70 in FIGS. 13–15 and comprises a cylindrical block 71 of filter material having a central bore 72 therein opening through the outlet end and terminating in spaced relationship to the inlet end. The block 71 of filter material is held within a generally cup-shaped housing 73 having a perforated side wall coterminous with the side wall of the filter block 71, and a perforated end wall 74 disposed across the inlet end of the filter block.

An annular imperforate wall 75 extends radially outwardly from the outlet end of the perforated cylindrical side wall 73, and extends downwardly at its outer periphery to form a cylindrical sleeve or skirt 76 extending in radially outwardly spaced, concentric relationship to the perforated wall 73. A pair of bendable tabs 77 and 78 are formed on the inlet end of the sleeve or skirt 76.

In use, the filter device 70 is inserted into the end of a straw 16, with the skirt 76 fitting snugly within the straw to frictionally retain the device in the straw, and the tabs 77 and 78 are bent upwardly to grip the ends of the straw between the tabs and the inlet end of the skirt.

The filter material in this form of the invention may comprise a single filter media for removing a single contaminant from the liquid, or it may comprise a mixture of different filter media for removing a plurality of contaminants from liquid.

A seventh embodiment of the first form of the invention is indicated generally at 80 in FIG. 16 and comprises a block 81 of filter material with a perforated screen 82 bonded to the inlet end thereof and having bendable tabs 83 and 84 for gripping the end of a straw 16 received over the block 81. As in the previously described examples, the filter block 81 may comprise one or more filter media selected for their ability to remove one or a plurality of contaminants from the liquid.

A first embodiment of a second form of the invention is indicated generally at 90 in FIG. 17. In this embodiment, a generally cup-shaped block 91 of filter material having a closed inlet end 92 and a hollow interior with an open outlet end 93 is disposed within an enlarged end 94 of a tubular member 95. This tubular member is designed to form a larger cavity for receiving the filter media than in the previously described forms of the invention. If desired, a suitable mouthpiece 96 may be provided for attachment to the tubular member as indicated in dot-and-dash lines.

A second embodiment of the second form of the invention is indicated generally at 100 in FIGS. 18–20, and is substantially the same as that shown in FIG. 17, except that a perforated screen 101 is bonded across the inlet end of the filter member 91' and has bendable tabs 102 and 103 thereon for gripping the end of the enlarged end section 94 of the tubular member 95 when the filter member is inserted into the enlarged end.

A third embodiment of the second form of the invention is indicated generally at 110 in FIGS. 21 and 22. In this embodiment, a generally cup-shaped block 111 of filter material has a closed inlet end 112 and an open outlet end 113, and an annular sealing member 114 is secured to the outlet end and projects radially beyond the outer circumference of the block 111.

When the filter device is received in the enlarged end 94 of a tubular member 95, the sealing ring 114 engages the inside surface of the enlarged end 94 to hold the filter block in place and seal against passage of liquid in bypassing relationship to the filter block 111. The filter block itself is spaced radially inwardly from the inner surface of the end 94, defining an annular channel 115 for flow of liquid upwardly along the outside of the filter block and thence inwardly through the side walls thereof to the open outlet end 113. This arrangement provides a larger surface area for filtration than that depicted in FIGS. 17–20, where the liquid to be filtered can enter the filter only through the inlet end wall. In all other respects, this embodiment is the same as that previously described in connection with FIGS. 17–20.

A fourth embodiment of the second form of the invention is indicated generally at 120 in FIG. 23. In this form of the invention, a generally cup-shaped filter block 121 having a closed inlet end 122 and an open outlet end 123 is adapted to be frictionally retained in an enlarged section 124 between and spaced from the ends of a tubular member 125. As shown, the enlarged section may be formed in two parts, 124a and 124b, whereby the parts may be separated from one another to enable replacement of the filter member 121. Any suitable means may be used to effect this, including a sliding friction fit, threads, etc. Alternatively, the enlarged section may be formed in one piece and the entire assembly made disposable so that once the filter member 121 becomes unserviceable, it is not replaced but the entire assembly is simply disposed of.

A fifth embodiment of the second form of the invention is indicated generally at 130 in FIG. 24. This embodiment is substantially the same as that shown in FIG. 23, except that the filter block 131 is inverted from the FIG. 23 position, whereby it has an open inlet end 132 and a closed outlet end 133. As before, the filter block 131 is confined within an enlarged section 134 in the tubular member 135. In this embodiment, the enlarged section 134 is shown as being in one piece.

A sixth embodiment of the second form of the invention is indicated generally at 140 in FIGS. 25 and 26. In this embodiment, the filter member 141 comprises a porous disk 142 disposed across the inlet to the filter device, and a block 143 of filter material disposed immediately above the disk 142. If the enlarged section 144 of the tubular member 145 is of one piece construction and not intended to be separated, the filter section 143 can be in loose granular form. Immediately above or downstream of the filter block 143 is a generally bowl-shaped rigid porous housing 146 enclosing a quantity of filter material 147. The filter material 147 may be of loose granular form, or it may be formed into a rigid block by use of a suitable binder. A central bore or depression 148 in the outlet end of the filter device 141 provides a greater surface area for filtration than would exist if the outlet end of the filter device were planar.

The filter device in any of those embodiments illustrated in FIGS. 23–25 may be made replaceable in the enlarged section of the tubular member, by constructing the enlarged section so that it is separable to gain access to the filter member, or the filter member may be permanently secured in place by making the enlarged section non-separable, as shown in FIGS. 24 and 25, for example. Moreover, the filter media in each example described herein may comprise one or more materials selected for their ability to remove different contaminants from the liquid, including removal of particulate matter, removal of objectionable tastes and odors, removal of harmful chemicals and metals, removal of microorganisms, and the like.

FIG. 27 illustrates a variation of the means for securing the filter device in place, wherein a threaded connection 150 is provided between the inner surface of the tubular member 151 and the outer surface of the filter device 152.

It should be noted that any of the various forms of the invention described and illustrated herein may be secured in position in any suitable way, as by a simple friction fit, such as depicted in FIGS. 1–12, 17 and 21, for example; a snap fit (not shown); retaining tabs, such as depicted in FIGS. 13–16 and 18–20, for example; or a threaded connection, such as depicted, for example, in FIG. 27. Moreover, a combination of one or more of these means for retaining the filter device in place may be used, as desired or necessary.

While particular embodiments of the invention have been illustrated and described in detail herein, it should be understood that various changes and modifications may be made to the invention without departing from the spirit and intent of the invention, as defined by the scope of the appended claims.

What is claimed is:

1. A personal, portable filter device for removing contaminants from liquid to be consumed, comprising:

an elongate tubular drinking straw of substantially uniform diameter, having an inlet end adapted to be placed in liquid to be filtered and an outlet end adapted to be placed in the mouth of a person using the filter device;

said inlet end being diametrically enlarged and having a relatively short diametrically enlarged inner surface to define an enlarged internal chamber in the inlet end; and a filter received in said internal chamber for filtering contaminants from liquid passing therethrough, said filter comprising a rigid cup-shaped body of filter material having an end wall and a short cylindrical side wall, said side wall being frictionally engaged over its length with said inner surface of the inlet end, and said end wall being substantially flush with the inlet end of the straw, whereby a user can immerse the inlet end of the straw in liquid to be filtered and can apply suction to the other end of the straw to draw the liquid through the strew and filter to remove contaminants from the liquid.

2. A filter device as claimed in claim 1, wherein:

a tapered shoulder is defined at an inner and of said internal chamber; and said side wall of said filter abuts against said tapered shoulder, with said end wall of said filter lying substantially flush with the inlet end of the straw.

* * * * *